United States Patent

Parks et al.

[11] Patent Number: 4,466,590
[45] Date of Patent: Aug. 21, 1984

[54] LIGHTWEIGHT TILT MOUNTING HEADS

[75] Inventors: Anthony J. Parks, Bury St Edmunds; Richard A. Lindsay, Stowmarket, both of England

[73] Assignee: W. Vinten Limited, Suffolk, England

[21] Appl. No.: 361,792

[22] Filed: Mar. 25, 1982

[30] Foreign Application Priority Data

Apr. 3, 1981 [GB] United Kingdom ............... 8110592

[51] Int. Cl.$^3$ ........................................... F16M 11/10
[52] U.S. Cl. ..................................... 248/185; 248/584
[58] Field of Search ............... 248/185, 571, 584, 599, 248/123.1, 162.1; 16/1 C

[56] References Cited

U.S. PATENT DOCUMENTS 4,040,587  8/1977  Gottschalk et al. ................ 248/185
4,180,050  12/1979  Sizemore ............................ 248/185
4,206,898  6/1980  Salter ................................. 248/571

Primary Examiner—William H. Schultz
Assistant Examiner—Ramon O. Ramirez
Attorney, Agent, or Firm—Larson and Taylor

[57] ABSTRACT

A tiltable mounting with a tilt counterbalancing mechanism, the mechanism being connected between the tilting platform and the base and comprising a base connected member to which a slide is pivoted; the slide having an end restrainer fitted at each end; springs sandwiched between two plates slidable along the slide but not past the restrainers, plate position controlling arms pivoted to the tilting platform to force one of the plates; dependent on direction of tilt; to compress the springs against the other plate which is prevented from sliding by its associated restrainer. The ratio of the angular movement of the tilting platform and the slide being 2:1.

7 Claims, 8 Drawing Figures

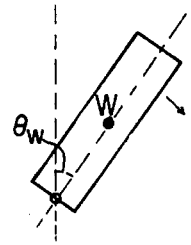
FIG. 5a  FIG. 5b
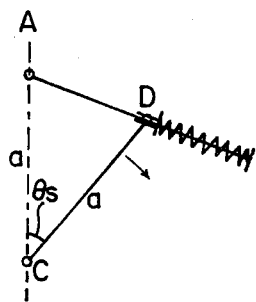
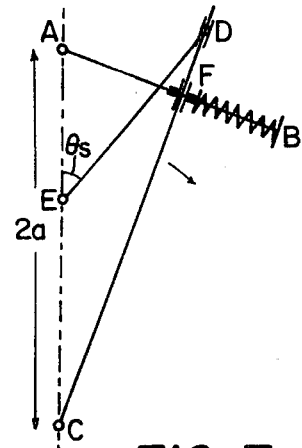
FIG. 6  FIG. 7

LIGHTWEIGHT TILT MOUNTING HEADS

This invention relates to tiltable mountings, and more particularly, though not exclusively, to tilting mountings for supporting articles such as television, cinematograph or electronic news gathering cameras, in such a manner that the articles may be smoothly and easily tilted, i.e. the extremities of the article in a longitudinal plane change their angle of elevation relative to the C of G; i.e. centre of gravity; of the article. A camera panning head has the further function of permitting a camera to be panned i.e., turned to and fro, or rotated about, an axis lying in a vertical plane. Hereinafter the invention is described with reference to a camera, but it will be understood that other articles may be mounted on such tilting mountings.

In practice, owing to the weight of the camera tending to affect any tilt of the camera, it is difficult to achieve the desired smooth and easy tilting action, either away from or towards the horizontal longitudinal frame. In order to overcome this, there have been employed camera heads including springs, which exert a force contrary to the weight of the camera. There have been panning heads of the so called quadrant type in which the camera is held with its centre of gravity at the centre of curvature of a circular segment which is movably supported for example, on rollers or on a track, and there have also been used panning heads with curved cam plates and roller mechanisms for maintaining the centre of gravity in a horizontal plane. These previous heads are all relatively bulky in relation to the camera, especially that of the electronic news gathering camera, and also have other disadvantages such as the difficulty of changing their springs for different C of G and/or difficulty in changing the cams for the same reason and the difficulty of manufacturing the cams. Furthermore the angular displacement of the C of G about the vertical, retaining balance on existing heads of this type, is in the order of ±60° which is often insufficient.

It is therefore an object of the invention to provide a compact, lightweight tilt mounting in which the above-mentioned disadvantages are reduced or obviated.

According to the invention we provide a tiltable mounting comprising a base, tiltable support member pivoted thereto, mounting means on said base for pivotably locating a slide means; said slide means having a retaining means at each end; at least one spring compressible between one of said retaining means and a spring compression means pivotably located on said tiltable support member wherein a line drawn between the pivot of said slide means and the pivot of said base and said tiltable support member is at right angles to the longitudinal centre line of said spring when the pivots of said spring compression means and said slide means are co-axial, and the angular movement of the tiltable support member is twice that of the slide means about their respective pivot points.

The invention will now be described, by way of example only, in conjunction with the accompanying drawings in which FIG. 1 shows a basic side elevation of the mounting FIG. 2 shows a basic end elevation of the mounting FIG. 3 shows a basic side elevation of the tilt mechanism FIG. 4 shows a basic side elevation of the tilt mechanism when tilted FIG. 5 shows theoretical diagrams of the requirement; when the body is rotated in a vertical plane (FIG. 5a) and when rotated through an angle $\theta$ (FIG. 5b)

FIG. 6 shows a theoretical layout of pivots and spring and

FIG. 7 shows an alternative theoretical layout of pivots and spring.

Figure 1:
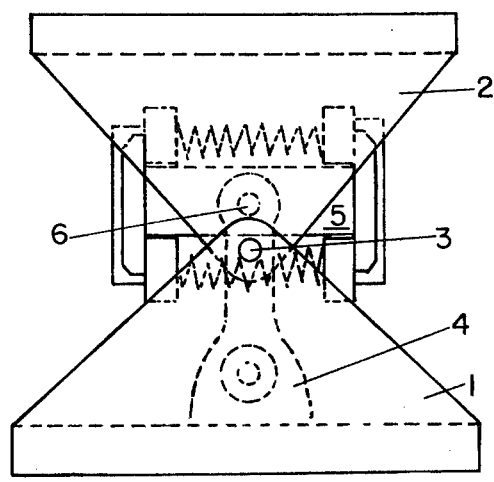

Referring to FIG. 1 a base (1) has a tiltable support member (2) pivotably mounted on pivot (3). A support (4) located in and mounted on base (1) has a tilt counterbalancing means generally shown as (5) pivotably mounted on pivot (6) of the support (4).

Figure 2:
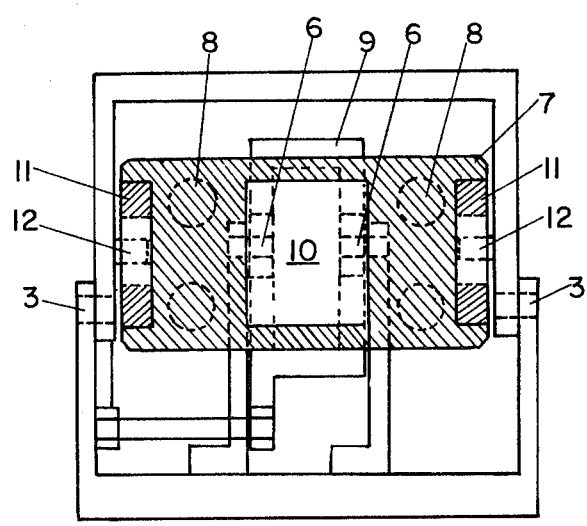

Referring to FIG. 2 wherein the same numerals represent the same structural pieces the counterbalancing means (5) has two end plates (7) between which a spring or plurality of springs (8) may be located. The two plates (7) are each slidable along a slide means (9) which has a retaining means (10) at each end against which the plates abut. Two spring compression means (11) (more clearly seen on FIGS. 3 and 4) each pivotably mounted on their own pivots (12) act upon one of plates (7) to compress the spring (8) when the counterbalance means (5) is tilted about pivot (6) due to tilting movement of the tiltable support member (2) about pivot (3) (more clearly seen on FIG. 4). When the tiltable support member (2) is parallel to the base (1) and the axes of pivots (3), (6) and (12) are in a single plane the longitudinal centre line of the slide means (9), or in this specific example springs (8), is at right angles to that plane and the spring, or springs (8), is under minimum or no compression.

Figure 3:
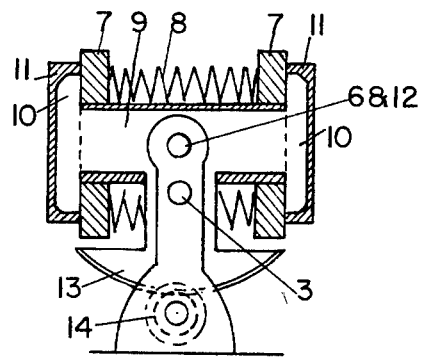
Figure 4:
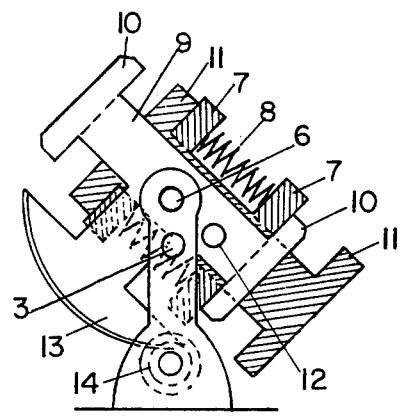

Referring now to FIGS. 3 and 4 as the tiltable support member tilts about pivots (3), pivots (12) rotate about pivots (3) and the slide means tilts about pivots (6) and in the same direction as that of the tiltable support member but with half the angular movement. In so doing, the spring compression means (11) pivoted at (12) acts on the appropriate plate (7) to compress the spring, or springs, (8) against the second plate which is retained in position by the appropriate retaining means (10) on the slide means (9).

The spring or plurality of springs, are selected to suit the height of the centre of gravity and/or weight of the camera above pivots (3) so that the resultant torque caused by the spring compression exactly counterbalances the torque caused by tilting the camera about pivots (3).

To provide greater stability and maintain correct relationship between the tiltable support member (2) and counterbalance means (5) a drive mechanism interconnects the tiltable support member (2) and counterbalance means (5). Though shown as a toothed quadrant (13) operating on gear wheels (14) this drive mechanism may take any known form with a ratio of 2:1.

To provide a sense of feel to the mounting a fluid drag system or a lubricated friction system such as described in G.B. Pat. No. 1588546 may be fitted to the tilt mechanism and advantageously to a pan pivot which may be fitted to the base (1).

Referring now to FIG. 5 the requirements of the counterbalancing means (5) are clearly shown.

A body of weight W whose centre of gravity is positioned a distance r vertically above a point about which it is constrained to rotate in a vertical plane (FIG. 5a). If the body is rotated through angle $\theta$ (FIG. 5b), then the change in its potential energy is given by the formula $$\Delta P.E. = Wr(1 - \cos\theta_w)$$

Referring now to FIG. 6 two links AB rotating about A, and CD rotating about C are connected by a sliding pivot D (or a 2:1 ratio transmission between A and C) such that AC=CD=a.

If a spring of rate K is arranged such that its deflection, from free length, equals the displacement AD, then the energy stored in the spring will be given by $$\text{Energy stored} = Ka^2(1 - \cos\theta_s)$$

If $Ka^2 = Wr$ and $\theta_s = \theta_w$, then the energy stored by the spring equals the potential energy lost by the tilting body and full counterbalance may be provided. The amount of compensation to obtain counterbalance may be varied by adjusting dimensions "a" or by changing the rate of the spring.

Referring now to FIG. (7) in this arrangement of the mechanism two links, CD (rotating about C) and ED (rotating about E) are connected by a sliding joint D such that ED=EC. A third link AB rotates about a point A on the line CE produced, and is connected by a sliding joint F to link CD such that the angle AFC is a right angle and angular movement of link ED is twice that of link CD.

If a spring of rate K is arranged such that its deflection (from free length) equals the displacement AF, then the energy stored in the spring will be given by the formula $$\text{Energy stored} = Ka^2(1 - \cos\theta_s) \text{ (when } a = AC/2\text{)}$$

If $Ka^2 = Wr$ and $\theta_s = \theta_w$, then the energy stored by the spring equals the potential energy lost by the tilting body and full counterbalance may be provided. The amount of compensation to obtain counterbalance may be varied by adjusting dimension "a" or by changing the rate of the spring.

It will also be obvious to those skilled in the art that various modifications, such as complete inversion of the mechanism, may be made without deviating from the invention.

We claim as our invention:

1. A tiltable mounting comprising a base, a tiltable support member pivoted thereto, mounting means on said base for pivotably locating a slide means, said slide means having a retaining means at each end, at least one spring compressible between one of said retaining means and a spring compression means pivotably located on said tiltable support member wherein a line drawn between the pivot of said slide means and the pivot of said base and said tiltable support member is at right angles to the longitudinal centre line of said spring when the pivots of said spring compression means and said slide means are co-axial, and the angular movement of the tiltable support member is twice that of the slide means about their respective pivot points.

2. A tiltable mounting as claimed in claim 1 wherein said spring comprises a plurality of springs located between at least two plates.

3. A tiltable mounting as claimed in claim 2 wherein said spring compression means and said retaining means act on the two plates to compress said springs in opposition to the torque caused by an article mounted on said tiltable support member when rotated about its pivot.

4. A tiltable mounting as claimed in claims 1, 2 or 3 wherein a mechanical drive mechanism connects the tiltable support member and said slide means in a ratio of 2:1.

5. A tiltable mounting comprising a base, a tiltable support member pivoted thereto, mounting means on said base for pivotably locating a slide means, said slide means having a retaining means at each end, at least one spring compressible between one of said retaining means and a spring compression means pivotably located on said tiltable support member wherein a line drawn between the pivot of said slide means and the pivot of said base and said tiltable support member is at right angles to the longitudinal centre line of said spring when the pivots of said spring compression means and said slide means are coaxial, and the angular movement of the tiltable support member is twice that of the slide means about their respective pivot points, said mounting further comprising means for producing "feel".

6. A tiltable mounting as claimed in claim 5 wherein said "feel" producing means comprises fluid drag means.

7. A tiltable mounting as claimed in claim 5 wherein said "feel" producing means comprises lubricated friction means.

* * * * *